United States Patent
Jeong et al.

(10) Patent No.: US 11,396,591 B2
(45) Date of Patent: Jul. 26, 2022

(54) COMPOSITION FOR MANUFACTURING LIGHTWEIGHT FOOTWEAR HAVING IMPROVED HEAT-RESISTANCE AND LIGHTWEIGHT FOOTWEAR MANUFACTURED USING THE SAME

(71) Applicants: NANOTECH CERAMICS CO., LTD., Busan-si (KR); KOREA INSTITUTE OF FOOTWEAR AND LEATHER TECHNOLOGY, Busan-si (KR)

(72) Inventors: Sang Ok Jeong, Busan-si (KR); Sang Young Park, Busan-si (KR); Dong Hun Han, Busan-si (KR); Young Min Kim, Busan-si (KR); Dan Bi Lee, Busan-si (KR)

(73) Assignees: NANOTECH CERAMICS CO., LTD., Busan-si (KR); KOREA INSTITUTE OF FOOTWEAR AND LEATHER TECHNOLOGY, Busan-si (KR)

( * ) Notice: Subject to any disclaimer, the term of this patent is extended or adjusted under 35 U.S.C. 154(b) by 0 days.

(21) Appl. No.: 16/390,688

(22) Filed: Apr. 22, 2019

(65) Prior Publication Data
US 2019/0322847 A1 Oct. 24, 2019

(30) Foreign Application Priority Data
Apr. 20, 2018 (KR) .................. 10-2018-0045878

(51) Int. Cl.
| C08L 23/06 | (2006.01) |
| C08K 3/36 | (2006.01) |
| C08K 3/04 | (2006.01) |
| C08K 3/26 | (2006.01) |
| C08K 5/053 | (2006.01) |
| C08L 23/08 | (2006.01) |
| C08K 3/30 | (2006.01) |
| C08K 5/092 | (2006.01) |

(52) U.S. Cl.
CPC ................ *C08L 23/06* (2013.01); *C08K 3/04* (2013.01); *C08K 3/26* (2013.01); *C08K 3/30* (2013.01); *C08K 3/36* (2013.01); *C08K 5/053* (2013.01); *C08K 5/092* (2013.01); *C08L 23/0815* (2013.01); *C08L 23/0853* (2013.01); *C08K 2003/265* (2013.01); *C08K 2003/267* (2013.01); *C08K 2003/3045* (2013.01); *C08K 2201/003* (2013.01); *C08L 2207/062* (2013.01); *C08L 2207/066* (2013.01)

(58) Field of Classification Search
CPC ....... C08L 23/06; C08L 23/0853; C08K 3/36; C08K 3/04
See application file for complete search history.

(56) References Cited

U.S. PATENT DOCUMENTS

| 4,430,468 A * | 2/1984 | Schumacher .......... C08K 13/02 524/109 |
| 4,719,039 A * | 1/1988 | Leonardi ............... B29C 70/882 252/511 |
| 4,800,126 A * | 1/1989 | Leonardi ............... B29C 70/882 252/511 |
| 5,057,252 A * | 10/1991 | Kagawa .................. C08L 23/06 264/416 |
| 7,741,397 B2 * | 6/2010 | Liang ..................... C08K 3/013 524/423 |
| 10,179,850 B2 | 1/2019 | Kusanose et al. |
| 2002/0143077 A1 | 10/2002 | Sueda et al. |
| 2009/0172970 A1 * | 7/2009 | Prieto et al. ......... D06N 7/0086 36/71 |

FOREIGN PATENT DOCUMENTS

| KR | 10-2001-0009382 A | 2/2001 |
| KR | 10-0456392 B1 | 11/2004 |
| KR | 10-2014-0133889 A | 11/2014 |

OTHER PUBLICATIONS

An Office Action mailed by the Korean Patent Office dated Nov. 13, 2019, which corresponds to Korean Patent Application No. 10-2018-0045878.

* cited by examiner

*Primary Examiner* — Margaret G Moore
(74) *Attorney, Agent, or Firm* — Studebaker & Brackett PC (57) ABSTRACT

The lightweight footwear of the present invention maintains excellent durability and improves heat resistance, so that contraction percentage due to a change with the passage of time is significantly low, rarely causing deformation, and thus, the lightweight footwear may be used in a high temperature and sanitary environment. In addition, the present invention solves the problem of the occurrence of premature foaming due to injection molding and a pattern on the appearance due to dispersion failure, thereby facilitating injection molding.

10 Claims, 2 Drawing Sheets

COMPOSITION FOR MANUFACTURING LIGHTWEIGHT FOOTWEAR HAVING IMPROVED HEAT-RESISTANCE AND LIGHTWEIGHT FOOTWEAR MANUFACTURED USING THE SAME

CROSS-REFERENCE TO RELATED APPLICATION

This application claims the benefit of Korean Patent Application No. 10-2018-0045878 filed on Apr. 20, 2018, in the Korean Intellectual Property Office, the disclosures of which is incorporated herein by reference.

FIELD OF THE INVENTION

The present invention relates to a composition for manufacturing lightweight footwear having improved heat resistance and lightweight footwear manufactured using the same and, more particularly, to a composition for manufacturing lightweight footwear having improved heat resistance, which is excellent in heat resistance and durability so as to be easily used under high temperature sterilization conditions, and a lightweight footwear manufactured using the same.

RELATED ART

Lightweight foam footwear has widely been used as a product group such as Crocs, Aqua shoes, sandals, slippers, and the like. In particular, lightweight foam footwear has widely been used by applying α-olefin-based polymers such as ethylene vinyl acetate (EVA), and since products are manufactured through a single foaming process using an injection phylon method, excellent productivity and usability are obtained.

In a method for manufacturing such products, a first generation method is a method of manufacturing a press product, a second generation method is a die-cut method, and a third generation method utilizes a compression molding phylon (CMP) method. A fourth generation IP method provides excellent formability (moldability) to advantageously manufacture products through single molding, and advantageously makes products having low hardness and high resilience using a general-purpose α-olefin material. Features of ethylene vinyl acetate (EVA)-based products have various advantages such as comfortableness and lightweightness, good cushioning feeling, low material cost which leads to high productivity, and waterproofing. In particular, injection pylons devices have been manufactured on the basis of α-olefin based materials, the devices are optimized for the materials.

In this connection, Korean Patent Registration No. 10-456392 discloses a composition for olefin-based elastomer crosslinked foam and footwear using the same.

Such lightweight foam footwear may advantageously be used in various kinds of footwear product groups. In particular, efforts have been made to utilize the lightweight foam footwear as cook footwear used in a kitchen or a medical footwear product used in a medical institution such as a hospital. Cook footwear and medical footwear are related to hygiene, and thus, sterilization is essential therefor while in use.

However, the foam using the α-olefin-based polymer as a material for lightweight foamed footwear is subject to contraction percentage due to a change over time in terms of characteristics of the foamed product and is rapidly deformed at a temperature of about 100° C. to 120° C., which is a temperature for steam sterilization. In addition, in the case of injection molding using a polymer having a high melting point, the existing α-olefin-based polymer products suffer from a problem of patterns generated on the appearance due to the premature foaming and dispersion failure due to flowability, viscosity, and crosslinking/foaming imbalance of the composition.

SUMMARY OF THE INVENTION

An aspect of the present invention is to provide a composition for manufacturing lightweight footwear having improved heat resistance, which is excellent in heat resistance and durability so as to be rarely deformed and easily injection-molded under high temperature sterilization conditions, and a lightweight footwear manufactured using the same.

In an aspect, the present invention provides a composition for manufacturing lightweight footwear having improved heat resistance, including a thermoplastic polymer mixture including a first polymer comprising at least one selected from the group consisting of an ethylene vinyl acetate copolymer, an ethylene octene copolymer, and an ethylene butene copolymer and a second polymer having a melting point ranging from 100° C. to 140° C., a filler, a foaming agent, a crosslinking agent, and a reactive additive, wherein the filler is contained in an amount of 5 to 50 parts by weight with respect to 100 parts by weight of the thermoplastic polymer mixture and has a particle diameter less than 20 μm.

In another aspect, the present invention provides a composition for manufacturing lightweight footwear having improved heat resistance, including a thermoplastic polymer mixture including a first polymer comprising at least one selected from the group consisting of an ethylene vinyl acetate copolymer, an ethylene octene copolymer, and an ethylene butene copolymer and a second polymer having a melting point ranging from 100° C. to 140° C., a filler, a foaming agent, and a crosslinking agent, wherein the filler is contained in an amount of 5 to 10 parts by weight with respect to 100 parts by weight of the thermoplastic polymer mixture and has a particle diameter less than 20 μm.

According to an embodiment of the present invention, the filler may be contained in an amount of 10 to 40 parts by weight with respect to 100 parts by weight of the thermoplastic polymer mixture, and the reactive additive may be contained in an amount of 3 to 12 parts by weight with respect to 100 parts by weight of the thermoplastic polymer mixture.

According to another embodiment of the present invention, the second polymer may be at least one selected from among low density polyethylene (LDPE), linear low density polyethylene (LLDPE), and high density polyethylene (HDPE).

According to another embodiment of the present invention, the filler may be at least one selected from the group consisting of calcium carbonate, magnesium carbonate, silica, carbon black, and calcium sulfate.

According to another embodiment of the present invention, the reactive additive may be at least one selected from the group consisting of a silane coupling agent, polyethylene glycol, polypropylene glycol, and itaconic acid.

According to another embodiment of the present invention, the composition may further include: an ethylene vinyl acetate copolymer having a melting index of 15 to 400 to prevent the occurrence of premature foaming during footwear manufacturing using the composition for manufacturing lightweight footwear having improved heat resistance, wherein the ethylene vinyl acetate copolymer having the melting index of 15 to 400 may be contained in an amount of 5 to 15 parts by weight with respect to 100 parts by weight of the thermoplastic polymer mixture.

In another aspect, the present invention provides a lightweight footwear using the composition for manufacturing lightweight footwear having improved heat resistance.

According to an embodiment of the present invention, the lightweight footwear may satisfy both of the following conditions (a) and (b):

$$0.3 \leq A_{100} \leq 1.5 \tag{a}$$

Here, $A_{100}$ denotes contraction percentage (%)=$(I_0-I)/I_0 \times 100$, $I_0$ denotes length of test piece of lightweight footwear (or specimen) before experiment, and I denotes length of test piece after the test piece was left in a convection oven and a steam sterilizer at 100° C. for 15 minutes and then stabilized at room temperature for 30 minutes or longer.

$$10.5 \leq B \leq 13 \tag{b}$$

Here, B denotes internal tearing strength, which was measured using a test piece of lightweight footwear having a thickness 3 mm according to a method specified in KS standard KSM 6518.

According to an embodiment of the present invention, the lightweight footwear may further satisfy the following condition (c):

$$1.2 \leq A_{120} \leq 2.3 \tag{c}$$

Here, $A_{120}$ denotes contraction percentage (%)=$(I_0-I)/I_0 \times 100$, $I_0$ denotes length of test piece of lightweight footwear before experiment, and I denotes length of test piece after the test piece was left in a convection oven and a steam sterilizer at 120° C. for 15 minutes and then stabilized at room temperature for 30 minutes or longer.

The lightweight footwear of the present invention maintains excellent durability and improves heat resistance, so that contraction percentage due to a change with the passage of time is significantly low, rarely causing deformation, and thus, the lightweight footwear may be used in a high temperature and sanitary environment.

In addition, the present invention solves the problem of the occurrence of premature foaming due to injection molding and a pattern on the appearance due to dispersion failure, thereby facilitating injection molding.

BRIEF DESCRIPTION OF THE DRAWINGS

The above and other objects and features of the present invention will become apparent from the following description of embodiments given in conjunction with the accompanying drawings, in which.

DETAILED DESCRIPTION

Hereinafter, embodiments of the present disclosure will be described in detail with reference to the accompanying drawings such that the embodiments may be easily practiced by those skilled in the art to which the present invention pertains.

As described above, the conventional composition for manufacturing lightweight footwear and the lightweight footwear manufactured using the same have the problems that contraction percentage occurs in shoes due to a change over time, and therefore, the shoes are rapidly deformed under steam sterilization conditions, and thus, the shoes cannot be used in a high temperature and hygienic environment. In addition, injection molding is not easy due to occurrence of a pattern on an appearance due to premature foaming and dispersion failure during injection molding.

Therefore, the present invention provides a composition for manufacturing lightweight footwear having improved heat resistance, including a thermoplastic polymer mixture including a first polymer comprising at least one selected from the group consisting of an ethylene vinyl acetate copolymer, an ethylene octene copolymer, and an ethylene butene copolymer and a second polymer having a melting point ranging from 100° to 140°, a filler, a foaming agent, a crosslinking agent, and a reactive additive, wherein the filler is contained in an amount of 5 to 50 parts by weight with respect to 100 parts by weight of the thermoplastic polymer mixture and has a particle diameter less than 20 μm.

As a result, since heat resistance is improved while excellent durability is maintained, contraction percentage due to a change over time is significantly low, rarely causing deformation, and thus, lightweight footwear which may be used in high temperature and hygienic environments may be provided. In addition, injection molding is facilitated by solving the problem of the occurrence of a pattern in appearance due to premature foaming and dispersion failure due to injection molding.

First, the thermoplastic polymer mixture will be described. The thermoplastic polymer mixture included in the present invention includes a first polymer and a second polymer.

Next, the first polymer included in the thermoplastic polymer mixture will be described. The first polymer is at least one selected from among an ethylene vinyl acetate copolymer, an ethylene octene copolymer, and an ethylene butene copolymer. When the first polymer is used, a relatively soft, highly resilient, and lightweight product having excellent water-repellency and productivity may be manufactured and such a lightweight product may be easily applied to various footwear product groups.

Next, the second polymer will be described. The second polymer, which is added to significantly lower contraction percentage in a high temperature range, may be a polymer having a melting point of 100° C. to 140° C. The second polymer is preferably at least one selected from the group consisting of low density polyethylene (LDPE), linear low density polyethylene (LLDPE), an olefin block copolymer (OBC), and high density polyethylene (HDPE) having a melting point of 100° C. to 140° C., and more preferably at least one selected from among LDPE, LLDPE, and HDPE having a melting point of 100° C. to 140° C.

Mixing the second polymer with the thermoplastic polymer mixture may improve heat resistance to lower contraction percentage, and when the second polymer is included together with a filler and a reactive additive, heat resistance may further be improved and various physical properties may be improved.

According to an embodiment of the present invention, a weight ratio of the first polymer to the second polymer included in the thermoplastic polymer mixture may be 1:9 to 9:1, more preferably 2:8 to 8:2, further preferably 3:7 to 7:3, and most preferably 3:7 to 6:4. When the first polymer and the second polymer are contained within the above range in thermoplastic polymer mixture of the present invention, a lightweight, highly resilient product having various physical properties may be manufactured.

Meanwhile, the thermoplastic polymer mixture may further include at least one selected from the group consisting of polypropylene (PP), polyolefin elastomer (POE), olefin block copolymer (OBC), polybutene (PB), and polyisobutylene (PIB), in addition to the polymer described above. By mixing such a polymer, it is possible to provide an intended composition for soft, lightweight footwear while having water resistance, ease of injection molding, durability, and heat resistance.

Next, the filler will be described. The filler, which serves to improve mechanical strength and heat resistance of the present invention, may be included in the composition for manufacturing lightweight footwear of the present invention to improve the mechanical strength and heat resistance. Preferably, the filler may be at least one selected from the group consisting of calcium carbonate, magnesium carbonate, silica, carbon black, calcium sulfate, and talc, and more preferably, at least one selected from the group consisting of calcium carbonate, magnesium carbonate, and silica.

The filler may be contained in an amount of 5 to 50 parts by weight, preferably, 10 to 40 parts by weight, and more preferably 12 to 35 parts by weight with respect to 100 parts by weight of the thermoplastic polymer mixture. If the filler is contained in a content less than the above range, the effect of heat insulation and heat resistance may be significantly deteriorated, and if the filler is contained in a content exceeding the above range, aggregation of the filler may occur to degrade dispersibility, leading to defective foaming and crosslinking to make injection molding not easy.

A particle diameter of the filler must be less than 20 μm, preferably, not more than 15 μm, more preferably, not more than 12 μm, and even more preferably, not more than 10 μm. As described above, when such a filler having a small particle size is used, a larger amount of filler may be dispersed and increased in a certain space, and thus, heat insulation properties and heat resistance may be significantly improved. That is, the use of the filler within the above range may minimize contraction percentage based on a change with the passage of time in a high temperature and hygienic environment, thereby preventing deformation. If a filler that does not satisfy the above range is used, the amount of the filler dispersed in the certain space may be reduced, lowering heat insulation properties and heat resistance and causing a mold-caught phenomenon due to non-foaming in a molding mold in case of injection molding, making the injection molding not easy.

Figure 1:
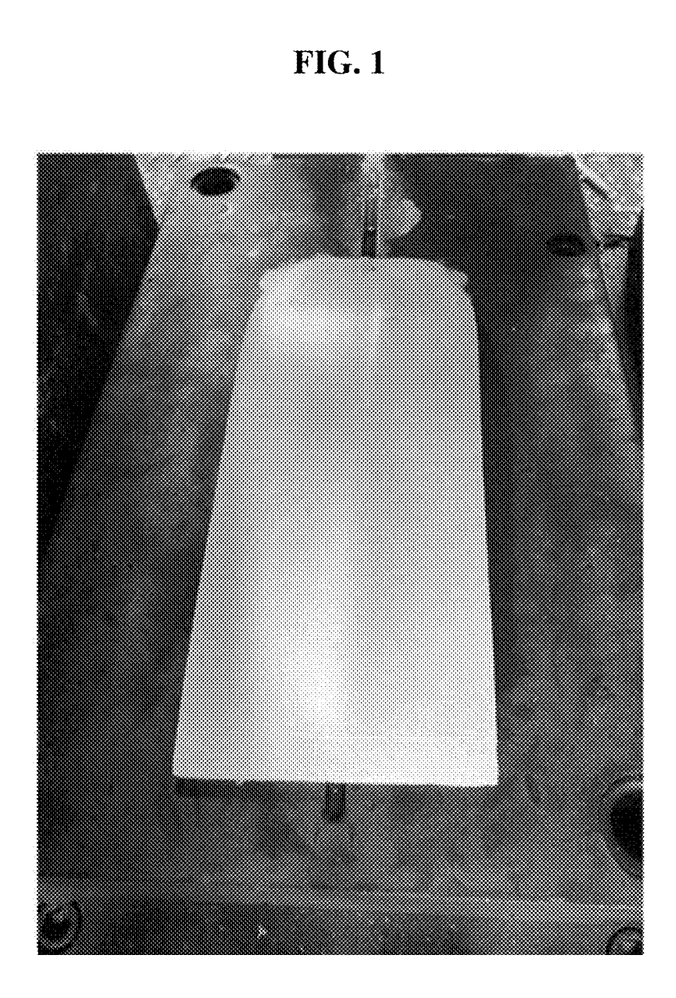
FIG. 1 shows a distortion failure phenomenon in case of performing injection molding.
Figure 2:
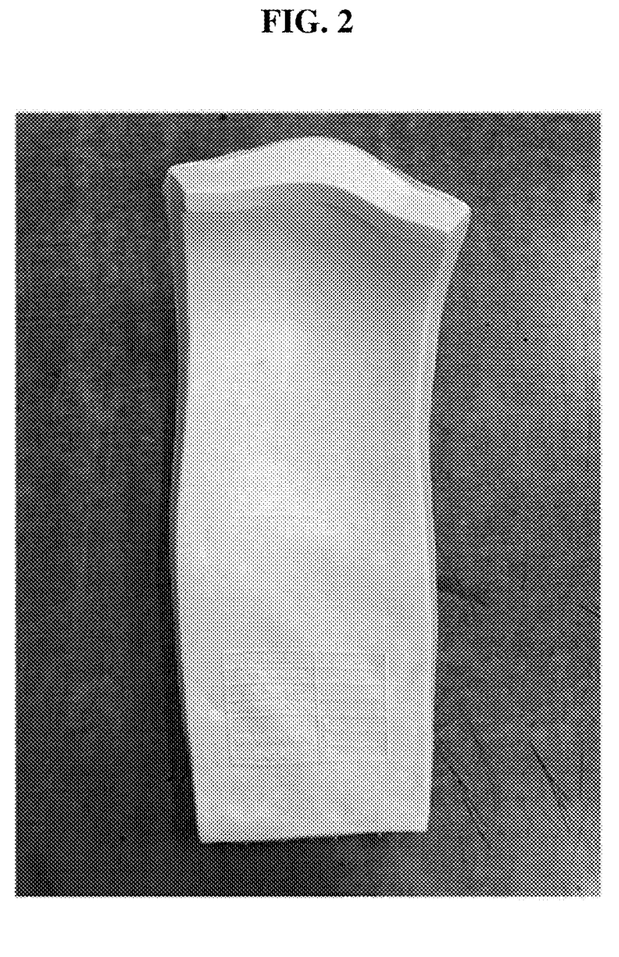
FIG. 2 shows a molding mold-caught failure phenomenon due to non-foaming in case of performing injection molding.

Specifically, FIG. 1 is a view showing a distortion failure phenomenon in the case of performing injection molding, and FIG. 2 is a diagram showing molding mold-caught failure phenomenon due to non-foaming in the case of performing injection molding. Referring to the drawings, it can be seen that the occurrence of distortion or mold-caught phenomenon makes injection molding not easy, leading to a difficulty in manufacturing an intended product.

Next, the reactive additive will be described. When the above-mentioned reactive additive is contained in the present invention together with the above-mentioned filler, the filler may be uniformly dispersed, thus significantly improving heat resistance. In addition, it is possible to prevent premature foaming and dispersion failure, and thus, injection molding is easy. That is, the present invention may provide a composition for manufacturing lightweight footwear, which may be evenly dispersed even when a large amount of filler having a small particle size is contained in the reactive additive, thereby facilitating injection molding and improving heat resistance.

As the reactive additive, an agent which is treated in the filler to improve dispersibility of the filler to improve heat insulation properties and heat resistance of the present invention may be used. The reactive additive is, preferably, at least one of a silane coupling agent, polyethylene glycol, polypropylene glycol and itaconic acid, and more preferably, a silane coupling agent.

Preferably, the reactive additive may be contained in an amount of 3 to 12 parts by weight with respect to 100 parts by weight of the thermoplastic polymer mixture. If the reactive additive does not satisfy the above range, it is difficult to evenly disperse the filler, which may lead to a problem that the ease of injection molding is significantly reduced.

According to an embodiment of the present invention, the reactive additive may be pre-treated in the filler, and the filler with the reactive additive pre-treated therein may be added to the thermoplastic polymer mixture to form the composition of the present invention. The pretreatment of the reactive additive may be performed by dispersing a solution of the reactive additive using an atomizer or an injector. Alternatively, the pretreatment of the reactive additive may be performed by injecting the filler into a super mixer, stirring the mixture at a high speed, and then, adding the solution of the reactive additive. In the case of using the solution of the reactive additive, a solvent may preferably be ethanol.

Next, the foaming agent will be described. The foaming agent is a material which may be mixed with the thermoplastic polymer mixture of the present invention to form bubbles, and a material widely used in the art to manufacture lightweight footwear may be used. Preferably, the foaming agent may be at least one selected from the group consisting of an azodicarbonamide (ADCA)-based agent, a dinitrosopenta methylene tetramine (DPT)-based agent a toluene sulfonyl hydrazide (TSH)-based agent, an inorganic agent, and a capsule type foaming agent (Micropearl).

According to an embodiment of the present invention, the foaming agent may be added in an amount of 1 to 10 parts by weight, more preferably, 5 to 10 parts by weight with respect to 100 parts by weight of the thermoplastic polymer mixture. When the above range is satisfied, highly resilient, lightweight foam footwear may be manufactured.

Next, the crosslinking agent will be described. The crosslinking agent serves to improve various physical properties of the composition for manufacturing lightweight footwear of the present invention. The crosslinking agent may be a crosslinking agent commonly used in the art, and preferably, at least one selected from the group consisting of 2,5-bis(tertbutylperoxy)-2,5-dimethyl-3-hexene, ditertbutylperoxide, 2,5-bis (tertbutylperoxy)-2,5-dimethyl-hexene, dibenzoyl peroxide, bis(tertbutylperoxyisopropyl)benzene, butyl 4,4-bix(tertbutylperoxy)valerate, 1,1-bis(tertbutylperoxy)3,3,5-trimethylchlorohexane, tertbutyl peroxybenzoate, lauryl peroxide, and dicumyl peroxide (DCP).

According to an embodiment of the present invention, the crosslinking agent may be contained in an amount of 0.5 to 5 parts by weight, more preferably, 1 to 3 parts by weight with respect to 100 parts by weight of the thermoplastic polymer mixture. If the content of the crosslinking agent is less than the above range, a crosslinking degree of a foaming body is so low that mechanical strength is lowered and loss of a foaming gas is increased to cause failure of formation of a foaming body. If the content of the crosslinking agent is more than the above range, the crosslinking degree may be so high to suppress expansion to cause a foaming cell to be burst.

In addition, the composition for manufacturing lightweight footwear of the present invention may further contain, in addition to the above-mentioned materials, a co-crosslinking agent, a premature foaming preventing additive, a metal oxide, stearic acid, a filler, and the like within limits not hurting the physical properties intended to be obtained by the present invention.

The co-crosslinking agent may be added to prevent excessive decomposition of the thermoplastic polymer and to maintain stability of a produced radical, and here, a material generally used in the art may be used as the co-crosslinking agent. Preferably, divinylbenzene, ethylene glycol dimethacrylate, triallyl cyanurate (TAC), diethylene glycol dimethacrylate, allyl methacrylate, or trimethylolpropane trimethacrylate may be used. Also, preferably, the co-crosslinking agent may be added in an amount of 0.1 to 2 parts by weight with respect to 100 parts by weight of the thermoplastic polymer mixture.

The premature foaming preventing additive may be added to prevent premature foaming in an injection machine, which may occur when a polymer having a high melting point is used. A material which is generally used in the art may be used, but an ethylene vinyl acetate copolymer having a melting index of 15 to 400 may be used.

The ethylene vinyl acetate copolymer may be contained in an amount of preferably 2 to 20 parts by weight, more preferably, 5 to 15 parts by weight with respect to 100 parts by weight of the thermoplastic polymer mixture. If the content of the premature foaming preventing additive is less than the above range, the effect of viscosity control may deteriorate and premature foaming may occur. If the content of the premature foaming preventing additive is greater than the above range, the overall composition may be affected and mechanical properties and heat resistance may deteriorate.

The metal oxide may be added as a crosslinking activator and a reinforcing agent to control a crosslinking rate and accelerate decomposition of the foaming agent. A material generally used in the art may be used as the metal oxide. The metal oxide is preferably at least one selected from group consisting of zinc oxide, magnesium oxide, titanium oxide, and calcium oxide.

Preferably, the metal oxide may be contained in an amount of 3 to 12 parts by weight, more preferably, 5 to 10 parts by weight with respect to 100 parts by weight of the thermoplastic polymer mixture. If the metal oxide is contained in an amount less than 3 parts by weight, a crosslinking rate and a foaming rate may be lowered. If the metal oxide is contained in excess of 8 parts by weight, density of the foaming body may increase due to the increase in the amount of the metal oxide in use to degrade performance.

The stearic acid may be added as an internal releasing agent to improve storage stability and workability. The stearic acid is preferably contained in an amount of 0.5 to 1 part by weight with respect to 100 parts by weight of the thermoplastic polymer mixture. If the content of stearic acid does not satisfy the above range, the storage stability may be deteriorated or the workability may be difficult to control.

Also, in order to solve the above-mentioned problems, the present invention provides a composition for manufacturing lightweight footwear having improved heat resistance, including a thermoplastic polymer mixture including a first polymer including at least one selected from the group consisting of an ethylene vinyl acetate copolymer, an ethylene octene copolymer, and an ethylene butene copolymer and a second polymer having a melting point ranging from 100° C. to 140° C., a filler, a foaming agent, and a crosslinking agent, wherein the filler is contained in an amount of 5 to 10 parts by weight with respect to 100 parts by weight of the thermoplastic polymer mixture and has a particle diameter less than 20 μm.

In this case, since excellent durability is maintained and heat resistance is improved, contraction percentage ratio due to change with time is significantly low, and little deformation is caused, so that lightweight footwear which may be used in a high temperature and sanitary environment may be provided. In addition, there is an effect of facilitating injection molding by solving the problem of occurrence of a pattern in appearance due to premature foaming and dispersion failure due to injection molding.

In this case, since excellent durability is maintained and heat resistance is improved, contraction percentage due to a change with the passage of time is significantly low, rarely causing deformation, and thus, the lightweight footwear which can be used in a high temperature and sanitary environment may be provided. In addition, since the occurrence of premature foaming due to injection molding and a pattern on the appearance due to dispersion failure is solved, injection molding is facilitated.

Hereinafter, details, except for the repeated content, will be described.

The filler is contained in an amount of 5 to 10 parts by weight with respect to 100 parts by weight of the thermoplastic polymer mixture. If the filler is contained in an amount of less than 5 parts by weight with respect to 100 parts by weight of the thermoplastic polymer mixture, the effect of heat insulation and heat resistance may be significantly lowered. In addition, if the filler is contained in an amount exceeding 10 parts by weight with respect to 100 parts by weight of the thermoplastic polymer mixture, aggregation of the filler may occur to degrade dispersibility to cause problems of foaming and crosslinking failure, making injection molding not easy.

Further, the present invention provides a lightweight footwear using the composition for manufacturing lightweight footwear having improved heat resistance as described above. Through this, it is possible to provide lightweight footwear which is easy to be injection-molded, has excellent physical properties, and is significantly improved in heat resistance so as to be utilized even in high temperature sterilization conditions.

Further, the present invention may provide lightweight footwear satisfying both of the following conditions (a) and (b):

$$0.3 \leq A_{100} \leq 1.5 \qquad (a)$$

Here, $A_{100}$ denotes contraction percentage (%)=$(I_0-I)/I_0 \times 100$, $I_0$ denotes length of test piece of lightweight footwear before experiment, and I denotes length of test piece after the test piece was left in a convection oven and a steam sterilizer at 100° C. for 15 minutes and then stabilized at room temperature for 30 minutes or longer.

$$10.5 \leq B \leq 13 \qquad (b)$$

Here, B denotes internal tearing strength, which was measured using a test piece of lightweight footwear having a thickness 3 mm according to a method defined in KS standard KSM 6518.

In other words, the present invention has an effect of providing lightweight footwear having low contraction percentage based on a change with the passage of time to thus have excellent heat resistance and satisfy excellent physical properties.

Meanwhile, the condition (a) is more preferably $0.3 \leq A_{100} \leq 1.2$, and even more preferably $0.3 \leq A_{100} \leq 0.9$. Further, the condition (b) may more preferably be $10.7 \leq B \leq 13$, and even more preferably $12 \leq B \leq 13$.

According to an embodiment of the present invention, the lightweight footwear may further satisfy the following condition (c):

$$1.2 \leq A_{120} \leq 2.3 \quad (c)$$

Here, $A_{120}$ denotes contraction percentage (%)=$(I_0-I)/I_0 \times 100$, $I_0$ denotes length of test piece of lightweight footwear before experiment, and I denotes length of test piece after the test piece was left in a convection oven and a steam sterilizer at 120° C. for 15 minutes and then stabilized at room temperature for 30 minutes or longer.

The condition (c) may be more preferably $1.2 \leq A_{120} \leq 2.0$, and even more preferably $1.2 \leq A_{120} \leq 1.9$. Accordingly, it can be seen that the present invention achieves the effect of significantly reducing contraction percentage with the passage of time and thus significantly improving heat resistance.

As a result, the composition for manufacturing lightweight footwear having improved heat resistance of the present invention and the lightweight footwear using the same have excellent physical properties and significantly improved heat resistance, which are, thus, rarely deformed even at higher temperature sterilization conditions, and therefore, the composition for manufacturing lightweight footwear having improved heat resistance of the present invention and the lightweight footwear using the same may be used in diverse product groups such as food cook footwear and medical footwear.

Hereinafter, the present invention will be described in more detail with reference to specific examples.

TABLE 1

|  | Embodiment example 1 | Embodiment example 2 | Embodiment example 3 | Embodiment example 4 | Embodiment example 5 |
| --- | --- | --- | --- | --- | --- |
| First polymer | Ethylene vinyl acetate (EVA) | Ethylene vinyl acetate (EVA) | Ethylene vinyl acetate (EVA) | Ethylene vinyl acetate (EVA) | Ethylene vinyl acetate (EVA) |
| Second polymer | Linear low density polyethylene (LLDPE) | Low density polyethylene (LDPE) | Linear low density polyethylene (LLDPE) | Low density polyethylene (LDPE) | Low density polyethylene (LDPE) |
| Crosslinking activator and reinforcing agent | Zno, TiO$_2$ | Zno, TiO$_2$ | Zno, TiO$_2$ | Zno, TiO$_2$ | Zno, TiO$_2$ |
| Stearic acid | ◯ | ◯ | ◯ | ◯ | ◯ |
| Filler | Precipitated calcium carbonate (nano scale) | Magnesium carbonate (nano scale) | Silica (nano scale) | Magnesium carbonate (nano scale) | Silica (nano scale) |
| Reactive additive | Silane coupling agent | Silane coupling agent | Silane coupling agent | Silane coupling agent | X |
| Crosslinking agent | DCP | DCP | DCP | DCP | DCP |
| Co-crosslinking agent | TAC | TAC | TAC | TAC | TAC |
| Organic foaming agent | ◯ | ◯ | ◯ | ◯ | ◯ |

|  | Comparative Example 1 | Comparative Example 2 | Comparative Example 3 | Comparative Example 4 |
| --- | --- | --- | --- | --- |
| First polymer | Ethylene vinyl acetate (EVA) | Ethylene vinyl acetate (EVA) | Ethylene vinyl acetate (EVA) | Ethylene vinyl acetate (EVA) |
| Second polymer | X | X | Low density polyethylene (LDPE) | Low density polyethylene (LDPE) |
| Crosslinking activator and reinforcing agent | Zno, TiO2 | Zno, TiO2 | Zno, TiO2 | Zno, TiO2 |
| Stearic acid | ◯ | ◯ | ◯ | ◯ |
| Filler | Calcium carbonate (over 20 μm) | Magnesium carbonate (over 20 μm) | Silica (over 20 μm) | Magnesium carbonate (nano scale) |
| Reactive additive | X | X | X | X |
| Crosslinking agent | DCP | DCP | DCP | DCP |
| Co-crosslinking agent | TAC | TAC | TAC | TAC |
| Organic foaming agent | ◯ | ◯ | ◯ | ◯ |

* Scale in the parenthesis of filler indicates particle diameter

TABLE 2

|  | Embodiment example 1 | Embodiment example 2 | Embodiment example 3 | Embodiment example 4 | Embodiment example 5 |
|---|---|---|---|---|---|
| First polymer | 60 | 30 | 60 | 30 | 60 |
| Second polymer | 40 | 70 | 40 | 70 | 40 |
| Metal oxide | 8 | 8 | 8 | 8 | 8 |
| Stearic acid | 1 | 1 | 1 | 1 | 1 |
| Filler | 25 | 30 | 15 | 20 | 10 |
| Reactive additive | 1.32 | 1.58 | 0.79 | 1.05 | X |
| Crosslinking agent | 1 | 1 | 1 | 1 | 1 |
| Co-crosslinking agent | 0.5 | 0.5 | 0.5 | 0.5 | 0.5 |
| Organic foaming agent | 4.7 | 4.7 | 4.5 | 4.6 | 4.6 |

|  | Comparative Example 1 | Comparative Example 2 | Comparative Example 3 | Comparative Example 4 |
|---|---|---|---|---|
| First polymer | 100 | 100 | 60 | 30 |
| Second polymer | — | — | 40 | 70 |
| Metal oxide | 8 | 8 | 8 | 8 |
| Stearic acid | 1 | 1 | 1 | 1 |
| Filler | 10 | 13 | 10 | 20 |
| Reactive additive | X | X | XX | |
| Crosslinking agent | 1 | 1 | 1 | 1 |
| Co-crosslinking agent | 0.5 | 0.5 | 0.5 | 0.5 |
| Organic foaming agent | 4.5 | 4.5 | 4.6 | 4.5 |

Table 1 shows materials contained in each of Embodiment Examples and Comparative Examples by parts by weight, in which the content of each material is represented by parts by weight with respect to 100 parts by weight of the thermoplastic polymer mixture.

Embodiment Example 1

In order to treat silane as a reactive additive in the filler based on Table 1 and Table 1 2, 50 wt % of silane as a reactive additive was added to 100 wt % of ethanol and stirred for 10 minutes. Silica gel was added to remove moisture remaining in the silane solution. 3 to 12 wt % of the silane solution with respect to 100 parts by weight of the filler was dispersed in the filler in an amount of 3 to 12 parts by weight using an atomizer. Thereafter, the silane solution was dried at a temperature of 80° C. or higher for 1 hour or more and then cooled. The reactive additive-treated filler and the thermoplastic polymer mixture based on Table 1 and Table 2 were mixed to form a master batch (M/B) to prepare pallets using a twin-screw extruder at a temperature of 150° C. to 180° C. Thereafter, the pallet composition and the foaming agent, the crosslinking agent, and the co-crosslinking agent were mixed using a kneader to form a master batch(M/B) to prepare final pellets at a temperature of 80° C. to 120° C. The final pellets were injected from an injection machine at 90° C. to 120° C. and finally molded by a mold at 155° C. to 180° C. to manufacture cook footwear.

Embodiment Examples 2 to 5 and Comparative Examples 1 to 4

The same as that of Example 1 was performed based on Table 1 and Table 2.

Experimental Example 1. Expansion Ratio (ER)

An expansion ratio (ER) of the cook footwear manufactured according to Embodiment Examples and Comparative Examples described above was calculated according to the following formula, and is shown in Table 3 below.

$$ER = F/M$$

Here, ER denotes expansion ratio, F denotes diagonal length of cooled foaming body, and M denotes diagonal length of mold.

Experimental Example 2. Density

In order to measure a specific gravity of the cook footwear manufactured according to Embodiment Examples and Comparative Examples, an analytical method specified in KS M 6519 was utilized using an MD200S automatic specific gravity gauge of Mirage (Japan). A specific gravity of the foaming body was measured by the method specified in KSM 6519 using an automatic specific gravity measuring device and is shown in Table 3 below. The measurement was carried out three times, and if the specific gravity deviated from a median value of the measured value by more than 20%, it was additionally measured and an average value is shown in Table 3 below.

Experimental Example 3. Hardness

In order to measure hardness of the cook footwear prepared according to Embodiment Examples and Comparative Examples described above, Type C of ASKER Co., Ltd. of Japan was used. Initial hardness of the foaming body was measured in a skin-on state after the foaming body was prepared, and later hardness of the foaming body was measured in a skin-off state in a cross-section by cutting the foaming body in a range in which an overall thickness was about 6 mm or greater using a method specified in KSM 6518. Here, time of about 5 seconds was held in consideration of the initial hardness and the later hardness, and an average value or each result after repeated measurement of three times were shown as hardness of the foaming body in Table 3.

Experimental Example 4. Mechanical Properties

In order to test mechanical properties of the cook footwear manufactured according to Embodiment Examples and Comparative Examples, 1435 UTM of Zwick, Germany, was used. Tensile strength (KSM 6518), internal tearing strength (KSM 6518), and elongation percentage (or strain) (KSM 6518) were measured and are shown in Table 3 below.

(1) The tensile strength and elongation percentage of the foaming body were measured by the method specified in KSM 6518 using test pieces having a thickness of 3 mm. Here, three test pieces were used in the same test, and when a test piece deviated by more than 20% from a median value of the measured value, the test piece was further measured at least once and an average value was calculated.

(2) The internal tearing strength of the foaming body was measured by the method specified in KSM 6518 using test pieces having a thickness of 3 mm. Here, three test pieces were used in the same test, and when a test piece deviated by more than 20% from a median value of the measured value, the test piece was further measured at least once and an average value was calculated.

Experimental Example 5. Resilience

In order to measure resilience (ASTM D 3574 Test H), measurement was made using a ball drop type rebound resilience tester (TT502A) under the following conditions.
Ball weight: 16.31 g
Drop height: 500 mm
Sponge thickness: 10 to 15 mm The resilience of the foaming body was measured by a ball drop method using test pieces having a thickness of 10 mm or greater. The same experiment was repeated 3 times, and maximum and minimum values were discarded and an average was calculated and shown in Table 3 below.

Experimental Example 6. Compression Set

A compression set was measured by a method specified in ASTM D3754.
50° C.×6 hours×50%

The measurement was carried out using test pieces of the foaming body manufactured to have a thickness of about 10 mm and having a cylindrical shape having a diameter of 30±0.05 mm. The test pieces were placed between parallel metal plates, a spacer corresponding to 50% of the thickness of the test pieces was inserted and compressed, and subsequently left for 6 hours in an air circulation oven maintained at 50±0.1° C. Thereafter, the test pieces were taken out from a compression device and aged at room temperature for 30 minutes, and thereafter, thicknesses thereof were measured. Three test pieces were used in the same test, and the compression set (Cs) was calculated by the following equation and is shown in Table 3 below.

$$Cs\ (\%) = [(t_0 - t_f)/(t_0 - t_s)] \times 100$$

Here, t0 denotes an initial thickness of the test piece, $t_f$ is a thickness of the test pieces when cooled after testing, and $t_s$ is a thickness of the spacer bar.

Experimental Example 7. Contraction Percentage

After lengths of the test pieces before experiment were measured, the test pieces were left at 100° C. and 120° C. for 15 minutes in a convection oven and a steam sterilizer and stabilized at room temperature for 30 minutes or longer, and thereafter, lengths of the test pieces were measured. Thereafter, contraction percentages (or shrinkage) were calculated according to the following equation and is shown in Table 3 below.

$$\text{Contraction percentage}\ (\%) = (I_0 - I)/I_0 \times 100$$

Here, $I_0$ denotes length of test piece of lightweight footwear (or specimen) before experiment, and I denotes length of test piece after the test piece was left in a convection oven and a steam sterilizer at 100° C. for 15 minutes and then stabilized at room temperature for 30 minutes or longer.

Experimental Example 8. Ease of Injection Molding

In the case of injecting the final pellets produced through Embodiment Examples and Comparative Examples described above from an injection machine and finally molding the same by a mold, a molding mold-caught failure phenomenon due to non-foaming, appearance distortion, and the like, were observed. Injection molding was performed 10 times, and cases where the above-mentioned failure phenomenon did not occur is indicated by ⊚, cases where the above-mentioned failure phenomenon occurred 1 to 3 times is indicated by ○, cases where the above-mentioned failure phenomenon occurred 4 to 7 times is indicated by ∆, and cases where the above-mentioned failure phenomenon occurred 8 to 10 times is indicated by x in Table 3 below.

TABLE 3

|  | Embodiment example 1 | Embodiment example 2 | Embodiment example 3 | Embodiment example 4 | Embodiment example 5 |
| --- | --- | --- | --- | --- | --- |
| Expansion ratio (ER) (%) | 159 | 156 | 156 | 154 | 160 |
| Density (g/cc) | 0.204 | 0.220 | 0.213 | 0.224 | 0.204 |
| Hardness (type c, 22.2° C.) | 54 | 59 | 59 | 60 | 54 |
| Tensile strength (kg/cm$^2$) | 24.9 | 24.3 | 24.6 | 24.2 | 25.4 |
| Internal tearing strength (kg/cm) | 12.8 | 10.7 | 11.9 | 11.3 | 10.8 |
| Elongation percentage (%) | 250 | 240 | 220 | 230 | 240 |
| Resilience (%, 22.2° C.) | 45 | 40 | 43 | 37 | 40 |

TABLE 3-continued

| | | | | | |
|---|---|---|---|---|---|
| Compression set (%) | 62 | 60 | 64 | 65 | 62 |
| Contraction percentage (%) 100° C., 15 min. | 0.6 | 0.7 | 0.8 | 0.8 | 1.2 |
| Contraction percentage (%) 120° C., 15 min. | 1.5 | 1.9 | 1.7 | 1.8 | 1.9 |
| Ease of injection molding | ◎ | ◎ | ◎ | ◎ | ◎ |

| | Comparative Example 1 | Comparative Example 2 | Comparative Example 3 | Comparative Example 4 |
|---|---|---|---|---|
| Expansion ratio (ER) (%) | 162 | 160 | 160 | 140 |
| Density (g/cc) | 0.201 | 0.208 | 0.210 | 0.290 |
| Hardness (type c, 22.2° C.) | 52 | 53 | 55 | 70 |
| Tensile strength (kg/cm$^2$) | 25.5 | 22.4 | 24.4 | 29.7 |
| Internal tearing strength (kg/cm) | 10.4 | 10.1 | 10.9 | 14.3 |
| Elongation percentage (%) | 240 | 230 | 210 | 200 |
| Resilience (%, 22.2° C.) | 42 | 41 | 36 | 38 |
| Compression set (%) | 67 | 64 | 70 | 65 |
| Contraction percentage (%) 100° C., 15 min. | 7.7 | 6.2 | 7.0 | — |
| Contraction percentage (%) 120° C., 15 min. | 9.5 | 8.0 | 9.9 | — |
| Ease of injection molding | ○ | Δ | ○ | X |

Referring to Table 3, it can be seen that Examples 1 to 4, which correspond to cases where the filler having a particle diameter less than 20 μm is contained in an amount of 15 parts by weight or more with respect to 100 parts by weight of the thermoplastic polymer mixture, have excellent physical properties such as hardness, tensile strength, internal tearing strength, and elongation percentage and significantly low contraction percentage, and thus, heat resistance is also significantly excellent. Meanwhile, Comparative Examples 1 to 3, which correspond to cases where the filler have a particle diameter exceeding 20 μm, have similar physical properties but significantly high contraction percentage exceeding 6.0%. As a result, it can be seen that heat resistance of Comparative Examples 1 to 3, in which the particle diameter of the filler is large, is significantly low.

Further, referring to Example 5, it can be seen that heat resistance is good even without a reactive additive, if the content of the filler having a particle diameter less than 20 μm is less than 10 parts by weight. However, it can be seen that heat resistance is relatively low because the contraction percentage is slightly high, relative to Embodiment Examples 1 to 4.

Comparative Example 4 does not include a reactive additive but includes 20 parts by weight of nano-scale magnesium carbonate with respect to 100 parts by weight of the thermoplastic polymer mixture. In this case, hardness is as high as 70 (Type C), but injection molding is difficult due to a phenomenon that magnesium carbonate is dispersed unevenly.

While the present invention has been particularly shown and described with reference to exemplary embodiments thereof, a person skilled in the art will understand that the invention is not limited to the disclosed exemplary embodiments but may be variously modified within the scope of the present invention. Therefore, the scope of the present invention should not be limited to the above-described embodiments but should be determined by all changes or modifications derived from the scope of the appended claims and equivalents of the following claims.

What is claimed is:

1. A composition for manufacturing lightweight footwear having improved heat resistance, the composition comprising:
    a thermoplastic polymer mixture including:
        a first polymer comprising at least one selected from the group consisting of an ethylene vinyl acetate copolymer, an ethylene octene copolymer, and an ethylene butene copolymer; and
        a second polymer having a melting point ranging from 100° C. to 140° C.;
    a filler;
    a foaming agent;
    a crosslinking agent; and
    a reactive additive that is configured to react with the filler to disperse the filler,
    wherein the second polymer is at least one selected from among low density polyethylene (LDPE), linear low density polyethylene (LLDPE), and high density polyethylene (HDPE),
    wherein the filler is contained in an amount of 12 to 35 parts by weight with respect to 100 parts by weight of the thermoplastic polymer mixture and has a particle diameter less than 10 μm,
    wherein the reactive additive is contained in an amount of 3 to 12 parts by weight with respect to 100 parts by weight of the thermoplastic polymer mixture,
    wherein the reactive additive is at least one selected from the group consisting of a silane coupling agent, polyethylene glycol, polypropylene glycol, and itaconic acid,
    wherein the composition further comprising an ethylene vinyl acetate copolymer having a melting index of 15 g/10 min to 400 g/10 min to prevent the occurrence of premature foaming during footwear manufacturing using the composition for manufacturing lightweight footwear having improved heat resistance,
    wherein the ethylene vinyl acetate copolymer having the melting index of 15 g/10 min to 400 g/10 min is contained in an amount of 5 to 15 parts by weight with respect to 100 parts by weight of the thermoplastic polymer mixture, and wherein a weight ratio of the first polymer to the second polymer included in the thermoplastic polymer mixture is 3:7 to 6:4.

2. The composition of claim 1, wherein
the filler is at least one selected from the group consisting of calcium carbonate, magnesium carbonate, silica, carbon black, and calcium sulfate.

3. The composition of claim 1, wherein the foaming agent is contained in an amount of 5 to 10 parts by weight with respect to 100 parts by weight of the thermoplastic polymer mixture.

4. The composition of claim 1, wherein the crosslinking agent is contained in an amount of 1 to 3 parts by weight with respect to 100 parts by weight of the thermoplastic polymer mixture.

5. The composition of claim 1, further comprising a co-crosslinking agent,
wherein the co-crosslinking agent is contained in an amount of 0.1 to 2 parts by weight with respect to 100 parts by weight of the thermoplastic polymer mixture.

6. The composition of claim 1, further comprising a metal oxide,
wherein the metal oxide is contained in an amount of 5 to 10 parts by weight with respect to 100 parts by weight of the thermoplastic polymer mixture.

7. The composition of claim 1, further comprising a stearic acid,
wherein the stearic acid is contained in an amount of 0.5 to 1 parts by weight with respect to 100 parts by weight of the thermoplastic polymer mixture.

8. A lightweight footwear using the composition for manufacturing lightweight footwear having improved heat resistance of claim 1.

9. The lightweight footwear of claim 8, wherein the lightweight footwear satisfies both of the following conditions (a) and (b):

$$0.3 \leq A_{100} \leq 1.5 \tag{a}$$

wherein $A_{100}$ denotes shrinkage $(\%)=(l_0-l)/l_0 \times 100$, $l_0$ denotes length of test piece of lightweight footwear before experiment, and l denotes length of test piece after the test piece was left in a convection oven and a steam sterilizer at 100° C. for 15 minutes and then stabilized at room temperature for 30 minutes or longer, $$10.5 \leq B \leq 13 \tag{b}$$

wherein B denotes internal tearing strength, which was measured using a test piece of lightweight footwear having a thickness 3 mm according to a method defined in KS standard KSM 6518.

10. The lightweight footwear of claim 9, wherein
the lightweight footwear further satisfies the following condition (c):

$$1.2 \leq A120 \leq 2.3 \tag{c}$$

wherein A120 denotes shrinkage $(\%)=(l0-l)/l0 \times 100$, l0 denotes length of test piece of lightweight footwear before experiment, and l denotes length of test piece after the test piece was left in a convection oven and a steam sterilizer at 120° C. for 15 minutes and then stabilized at room temperature for 30 minutes or longer.

* * * * *